United States Patent

Mou et al.

[11] Patent Number: 5,497,342
[45] Date of Patent: Mar. 5, 1996

[54] CELLULAR MULTIPLIER COMPRISING A TREE OF THE OVERTURNED STAIRS TYPE, AND METHOD OF IMPLEMENTATION

[75] Inventors: Zhi-Jian Mou, Arcueil; Francis Jutand, Paris, both of France

[73] Assignee: France Telecom, Paris, France

[21] Appl. No.: 338,159

[22] Filed: Nov. 9, 1994

Related U.S. Application Data

[63] Continuation of Ser. No. 137,517, Oct. 8, 1993, abandoned, which is a continuation of Ser. No. 735,519, Jul. 26, 1991, abandoned.

[30] Foreign Application Priority Data

Jul. 27, 1990 [FR] France ................... 90 09629

[51] Int. Cl.⁶ ............... G06F 7/50; G06F 7/52
[52] U.S. Cl. ............... 364/786; 360/757
[58] Field of Search ............... 364/754, 757, 364/760, 761, 765, 786

[56] References Cited

U.S. PATENT DOCUMENTS

| | | | |
|---|---|---|---|
| 4,752,905 | 7/1988 | Nakagawa et al. | 364/757 X |
| 4,868,778 | 9/1989 | Disbrow | 364/757 |
| 4,918,639 | 4/1990 | Schwarz et al. | 364/757 X |

FOREIGN PATENT DOCUMENTS 0332504  9/1989  European Pat. Off. .

OTHER PUBLICATIONS

IEEE Journal Of Solid State Circuits, vol. SC-21, No. 5, Oct. 1986, pp. 814–819; D. Zuras et al: "Balanced delay trees and combinatorial division in VLSI".

Primary Examiner—Roy N. Envall, Jr.
Assistant Examiner—Chuong D. Ngo
Attorney, Agent, or Firm—Larson and Taylor

[57] ABSTRACT

A multiplier of order p and of depth n+1 is formed by a root R constituted by a carry-save adder and by a multiplier body CO(p,n) of order p and of depth n formed by a five-input connector operator C(n,q) of rank q, the connector operator C(n,1) of rank 1 is connected to the root R, the connector operator C(n,q) of rank q comprising first and second carry-save adders (1, 2) connected in cascade. The multiplier body CO(p,n) further includes a tree A(p-1,n-2) of order p-1 and of depth n-2 formed by an arrangement of carry-save adders and connected to the first carry-save adder (1), and a multiplier body CO(p,n-1) of order p and of lesser depth n-1 formed analogously to the multiplier body CO(p,n) of greater depth n by recurrence, the multiplier body CO(p,n-1) of lesser depth being connected to the connector operator C(n,q). The multiplier is applicable to performing calculations and to implementing digital filters.

8 Claims, 8 Drawing Sheets

| | A | B | C | D | E | F | G | H | I | J | K |
|---|---|---|---|---|---|---|---|---|---|---|---|
| 1 | n | ICSA | ZM | OS | ZM2 | OS+ZM | OS2 | OS2+ZM | OS3 | 4.2 | WALLACE |
| 2 | 1 | 3 | 3 | 3 | | | | | | | 3 |
| 3 | 2 | 4 | 4 | 4 | | | | | | 4 | 4 |
| 4 | 3 | 5 | 6 | 6 | | | | | | | 6 |
| 5 | 4 | 6 | 8 | 9 | | | | | | 8 | 9 |
| 6 | 5 | 7 | 11 | 13 | 12 | | | | | | 13 |
| 7 | 6 | 8 | 14 | 18 | 16 | 19 | 19 | | | 16 | 19 |
| 8 | 7 | 9 | 18 | 24 | 23 | 27 | 28 | | | | 28 |
| 9 | 8 | 10 | 22 | 31 | 30 | 38 | 41 | | | 32 | 42 |
| 10 | 9 | 11 | 27 | 39 | 41 | 52 | 59 | 60 | 60 | | 63 |
| 11 | 10 | 12 | 32 | 48 | 52 | 70 | 83 | 87 | 88 | 64 | 94 |
| 12 | 11 | 13 | 38 | 58 | 68 | 92 | 114 | 125 | 129 | | 141 |
| 13 | 12 | 14 | 44 | 69 | 84 | 119 | 153 | 177 | 188 | 128 | 211 |
| 14 | 13 | 15 | 51 | 81 | 106 | 151 | 201 | 247 | 271 | | 316 |
| 15 | 14 | 16 | 58 | 94 | 128 | 189 | 259 | 339 | 385 | 256 | 474 |
| 16 | 15 | 17 | 66 | 108 | 157 | 233 | 328 | 458 | 538 | | 711 |
| 17 | 16 | 18 | 74 | 123 | 186 | 284 | 409 | 609 | 739 | 512 | 1066 |
| 18 | 17 | 19 | 83 | 139 | 223 | 342 | 503 | 798 | 998 | | 1599 |
| 19 | 18 | 20 | 92 | 156 | 260 | 408 | 611 | 1031 | 1326 | 1024 | 2398 |
| 20 | 19 | 21 | 102 | 174 | 306 | 482 | 734 | 1315 | 1735 | | 3597 |
| 21 | 20 | 22 | 112 | 193 | 352 | 565 | 873 | 1657 | 2238 | 2048 | 5395 |
| 22 | 21 | 23 | 123 | 213 | 408 | 657 | 1029 | 2065 | 2849 | | 8092 |
| 23 | 22 | 24 | 134 | 234 | 464 | 759 | 1203 | 2547 | 3583 | 4096 | 12138 |

FIG. 6b.

CELLULAR MULTIPLIER COMPRISING A TREE OF THE OVERTURNED STAIRS TYPE, AND METHOD OF IMPLEMENTATION

This application is a continuation of application Ser. No. 08/137,517 filed on Oct. 8, 1993 which is a continuation of application Ser. No. 07/735,519 filed on Jul. 26, 1991 both now abandoned.

The invention relates to a cellular multiplier comprising a tree of the overturned stairs type.

BACKGROUND OF THE INVENTION

The architecture of high-speed multipliers is particularly important in digital systems. Concerning the architecture of such multipliers, progress in the way calculations are performed is a critical factor not only with respect to the mere architecture per se of such multipliers, but also with respect to multiplier accumulators, the internal components of computers, digital filters, and, generally, all operators in which multiple operands are summed.

Initially, cellular multipliers comprising a tree were studied in depth by C. S. Wallace, and this work led to highspeed cellular multipliers being implemented that are referred to as "Wallace tree" multipliers.

In general, such multipliers are split into three parts: a modified Booth encoder; a multiple operand adder or partial product reducer; and a final adder. The most remarkable essential characteristic of a multiplier of this type appears in the operand adder, where N operands are summed as two numbers instead of one as is the usual practice, with this operation being written below as "(N,2) summing". To this end, the (N,2) multiple operand adder is constituted by an arrangement of cells comprising a tree of carry-save adders (a Wallace tree). Such a structure of adders of this type avoids horizontal carry propagation. This structure enables (N,2) summing to be performed very quickly, in a period of time proportional to $\log_{3/2} N$. For a more complete description of this type of adder, reference may be made by the article by C. S. Wallace entitled "A suggestion for a fast multiplier" published in IEEE Transactions on Electronic Computers, Vol. 13, pp. 14–17, Feb. 1964.

In theory, Wallace's work opened the way to achieving the bottom limit on the calculation time required for performing (N,2) summing when using carry-save adders.

However, implementing Wallace tree structures is made difficult and inconvenient because of the complex intricate interconnections, and this applies particularly when implementing them with plane topology using very large scale integration (VLSI) techniques in which a plurality of carry-save adders are superposed in a layer arrangement.

For this reason, most integrated circuit manufacturers have preferred (N,2) summing structures that make a regular architecture possible over structures that implement a Wallace tree, thereby accepting a compromise relating to calculation time. The most representative of these various other architectures are the following: an iterative array of carry-save adders described by J. Y. Lee, H. L. Garvin, and C. W. Slayman in an article entitled "A high speed high density silicon 8×8 bit parallel multiplier" published in the IEEE Journal of Solid State Circuits, Vol. SC-22, No. 1, pp. 35–40; Zuras-McAllister tree structures described in the article entitled "Balanced delay trees and combinatorial division in VLSI" by D. Zuras and W. H. McAllister published in IEEE Journal of Solid State Circuits, Vol. 21, pp. 814–819, No. 5, October 1986; and so-called "4-2" tree structures described by W. Li, J. Burr, M. Santoro, and M. Horowitz corresponding to U.S. patent application Ser. No. 088 096 filed Aug. 21, 1987. The calculation times of these three structures are respectively proportional to: N, $N^{1/2}$, and log(N).

The iterative array of carry-save adders provides the most regular architecture and it requires interconnections between adjacent layers only, however it suffers from the drawback of being the slowest.

Zuras-McAllister tree structures ("ZM trees") require inter-layer interconnections to be provided because the output of a carry-save adder is not connected to the adjacent adder but is connected to other adders. This has the effect of accelerating the calculation process, but at the cost of increasing the area of silicon required for receiving such a structure. It should nevertheless be underlined that the inter-layer inter-connections required by ZM trees are easy to provide and cheap, since only two inter-layer connection conductors are required. The number of inter-layer conductors is defined as a measure of the inter-layer transparency of carry-save adders, and constant transparency tree structures can lead to very compact topography. However, ZM trees diverge quickly from the Wallace limit as the number of operands N increases.

4-2 type trees appear to be particularly adapted to implementing ($2^m$, 2) summing, and this is very common in many applications. This type of tree can give rise to calculation time proportional to log(N) which is equal or close to the Wallace bottom limit. However, 2(m-2) inter-layer conductors are required, and this gives rise to a rapid growth in the area of silicon required.

More recently, a "p-th root" tree structure for a cellular multiplier has been described in French patent application No. 88 02701. This structure comprises carry-save adders interconnected by 4-input connectors. Although it approaches the Wallace bottom limit for low values of the number of operands N, calculation time is no longer optimum for large numbers of operands.

An object of the present invention is to remedy the abovementioned drawbacks by implementing a cellular multiplier comprising a tree enabling the Wallace bottom limit to be achieved or approached for large numbers of operands, with the calculation time of the tree cellular multiplier of the invention being substantially optimized.

Another object of the present invention is to implement a tree cellular multiplier enabling the number of inter-layer interconnections to be modified in comparison with the number of inter-layer interconnections in ZM tree cellular multipliers, for the purpose of increasing processing speed.

SUMMARY OF THE INVENTION

The cellular multiplier of the present invention comprising an overturned stairs tree includes a plurality of interconnected carry-save adders. It includes the improvement whereby a multiplier of order p and of depth or "height" n+1 is formed by: a root constituted by a carry-save adder; and a multiplier body of order p and of depth n where p designates a parameter for summing processing time of the form $N^{1/(p+1)}$, with N designating the number of operands to be processed. The multiplier body is formed firstly by: a five-input connector operator of rank q, written C(n,q). The connector operator C(n,1) of rank 1 is interconnected with the root. The connector operator C(n,q) of rank q includes first and second carry-save adders connected in cascade. Each of the first and second carry-save adders has three inputs, a sum output, and a carry output, the carry output of the first adder is connected to one of the inputs of said second adder. The connector operator C(n,q) of rank q includes three outputs constituted by the sum output of the first adder, and the sum and carry outputs of the second adder.

The multiplier body is formed secondly by a tree of order p−1 and of depth n−2. constituted by an arrangement of interconnected carry-save adders, the sum and carry outputs of the carry-save adder constituting the root of said tree are connected to respective inputs of the first adder of said connector operator C(n,q) of rank q; and by a multiplier body CO(p,n−1) of order p and lesser depth n−1, said multiplier body being formed analogously to the multiplier body of greater rank n, and being connected to said connector operator C(n,q) of rank q.

The tree cellular multiplier of the present invention is applicable in any digital calculation system, such as computers using high-speed iterative multipliers or so-called "pipe-line" structure multipliers.

BRIEF DESCRIPTION OF THE DRAWINGS

An embodiment of the invention is described by way of example with reference to the accompanying drawings, in which:

FIGS. 3b and 3c show implementation details of FIG. 3a;

FIG. 6b is a table of values corresponding to the graph of FIG. 6a.

DETAILED DESCRIPTION

Before describing the tree structure cellular multiplier per se of the present invention, various definitions are recalled with reference to FIG. 1 which relates to prior art tree structures made up from circuits or components such as carry-save adders referred to below as "ARC adders".

Figure 1:
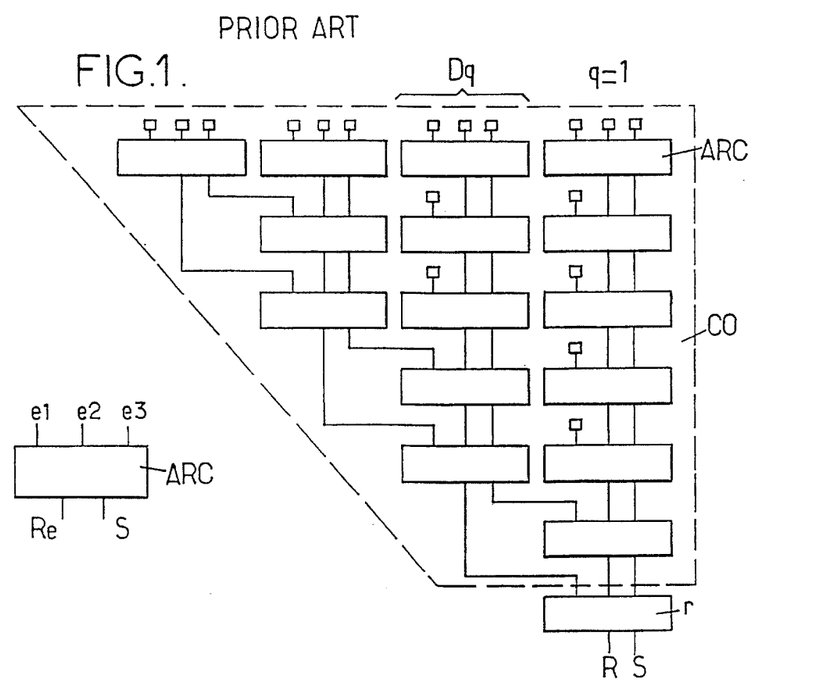
FIG. 1 is a diagram of the prior art showing a Zuras-McAllister structure referred to as a "ZM tree" structure.

To the left of FIG. 1, there is a diagram of a carry-save adder ARC having three inputs e1, e2, and e3, receiving the operands to be processed, a carry output referenced Re and a sum output referenced S. A tree structure comprising a plurality of such adders and as shown to the right in FIG. 1 usually includes a root referenced r which is generally constituted by one such adder, and a multiplier body referenced CO comprising a special arrangement of a plurality of such ARC adders.

An arrangement of a plurality of ARC adders in cascade within the multiplier body is referred to as a "degree", and written "Dq", with a cascade arrangement corresponding firstly to connecting the carry output Re or the sum output S to the same input of the next ARC adder in the sequence in the direction in which the operands are processed or the results of such processing are processed, and secondly to a common level of integration in the integrated circuits occupying a plurality of levels of integration, as described below. It may also be observed that the index q thus defines the rank of a degree or of a component part of the degree in the topology of the corresponding integrated circuit and in the representation of this topology as shown in FIG. 1, with rank 1, (i.e. q=1), being attributed by arbitrary convention to the corresponding degree that includes the root r, for example.

The overturned stairs tree cellular multiplier of the present invention is initially described with reference to FIG. 2a.

Naturally, the multiplier of the invention includes a plurality of interconnected ARC adders.

Figure 2A:
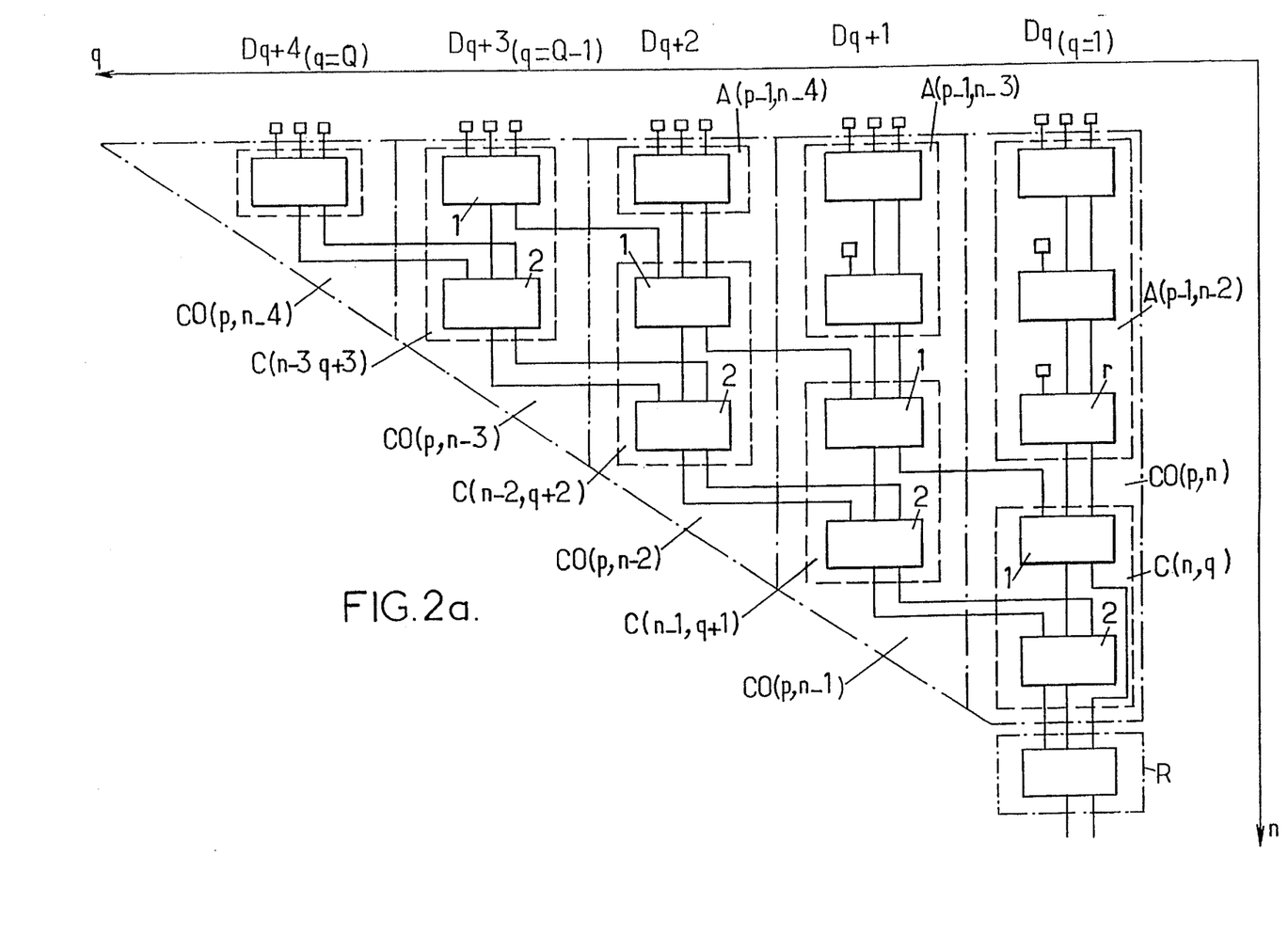
FIG. 2a shows a tree cellular multiplier of the present invention.

As shown in FIG. 2a, to make a multiplier of order p and of depth n+1, where the "depth" or "height" defines the length of the critical path followed by the operands to be processed in order to obtain the results of processing, said depth corresponding to the maximum number of ARC adders that each operand must pass through to contribute to the result of the processing, said multiplier is formed by a root referenced R and constituted by an ARC adder. The tree structure cellular multiplier of the invention is also formed by a multiplier body referenced CO(p,n) of order p and of depth n'. The index p designates a parameter for the summing processing time of the form $N^{1/p}$ where N designates the number of operands to be processed, and p is referred to as the order of the corresponding tree structure. The index n' designates the depth of the multiplier body.

As can be seen from observation of FIG. 2a, the multiplier body CO(p,n) is formed by a connector operator having five inputs, this connector operator being referenced C(n,q), the connector operator of rank 1 referenced C(n, 1) being interconnected with the root R. It will naturally be understood that the connector operator of rank 1 C(n,1) is implanted in the degree of rank 1 where q=1.

As also shown in FIG. 2a, connector operator C(n,q) includes first and second carry-save adders ARC connected in series and respectively referenced 1 and 2. Each of the first and second ARC adders 1 and 2 has three inputs, a sum output, and a carry output, and the carry output from the first ARC adder 1 is connected to one of the inputs of the second ARC adder 2. The connector operator C(n,q) thus includes three outputs constituted by the sum output of the first ARC adder 1 and by the sum output and the carry output of the second ARC adder 2.

As shown in FIG. 2a, the three outputs of connector operator C(n,q) for q=1, i.e. connector operator C(n,1), are thus connected to respective inputs of the root R.

As also shown in FIG. 2a, the multiplier body CO(p,n) also includes a tree of order p−1 and of depth n−2, said tree being referenced A(p–1,n–2). In general, this tree may be constituted by an arrangement of interconnected ARC adders. Naturally, the sum and carry outputs from the ARC adder constituting the root r of the above-mentioned tree A(p–1,n–2) are interconnected with respective inputs of the first ARC adder 1 of the connector operator C(n,q) and in particular the connector operator C(n,1).

FIG. 2a represents the above-mentioned tree A(p–1,n–2) by a number of ARC adders which is limited to three, in order to avoid overcrowding the drawing. Naturally, the tree A(p–1,n–2) may in fact be constituted by any type of tree of order p–1 and of depth n–2 to constitute a corresponding degree Dq, in particular a degree D1 of rank 1 and of depth n+1 including the above-mentioned tree, the connector operator C(n,q) with q=1, and the root R. Different implementations of trees of different kinds for constituting the tree A(p–1,n–2) are given below in the description.

In addition, as also shown in FIG. 2a, the multiplier body CO(p,n) of order p and of depth n also includes a multiplier body of order p and of lesser depth n–1, said multiplier body being referenced CO(p,n–1). Naturally the multiplier body of lesser depth n–1 is formed in similar manner to the multiplier body of greater depth n as described above, and so on recursively.

From FIG. 2, it will naturally be understood that each multiplier body referenced CO(p,n) thus comprises a tree referenced A(p–1,n–2) and a multiplier body of lesser depth referenced CO(p,n–1), the above-mentioned lesser depth tree and body being interconnected by means of a connector referenced C(n,q) to constitute the multiplier body of greater depth referenced CO(p,n).

The recurrence relationship for forming the multiplier body of the present invention can thus be established as follows:

$$CO(p,n)=CO(p,n-1)+A(p-1,n-2)$$

It will naturally be understood that the symbol "+" in the above relationship represents the interconnection of the tree A(p–1,n–2) and the multiplier body CO(p,n–1) by the connector of the rank under consideration C(n,q).

In FIG. 2a, the above recurrence relationship for the tree structure of the multiplier of the invention is represented by subdividing the structure by dashed lines within each degree of rank q, and by vertical dot-dashed lines, each of which represents a body CO of order p and of different depths in the range n to n-(q–1).

As can also be seen from FIG. 2a, the multiplier body of order p and of lesser depth n–1 and referenced CO(p,n–1) naturally includes a five-input connector operator referenced C(n–1,q+1) of greater rank q+1, and the three outputs from the above-mentioned connector operator are connected to respective inputs of the first and second ARC adders 1 and 2 constituting the connector operator of lower rank C(n,q). Naturally, the multiplier body CO(p,n–1) of lesser depth n–1 also includes a tree referenced A(p–1,n–3) of lower order p–1 and of lesser depth n–3, together with a multiplier body of the same order p and of lesser depth n–2, said multiplier body being referenced CO(p,n–2). The same applies to successive multiplier bodies formed by the degrees of higher order.

With respect to the conditions at the limit of the structure as shown in FIG. 2a, it may be observed that the degree of rank 1, i.e. for q=1, the depth n–2 of the tree A(p–1,n–(q+1)) defines firstly the number of degrees of higher rank, said number of degrees being equal to Q, where Q=n–1.

It will naturally be observed that since the depth of each tree A(p–1,n–2) decreases as a function of the rank q of each degree, the trees of degrees q=Q and q=Q–1 are considerably reduced, with these degrees then being respectively constituted by:

an ARC adder for the degree of order q=Q; and a five-input connector for the degree of rank q=Q–1, with the ARC adder constituting the degree of rank q=Q having its sum output S and its carry output Re connected to respective inputs of the ARC adder 2 constituting the connector forming the degree of lower rank q=Q–1.

Figure 2B:
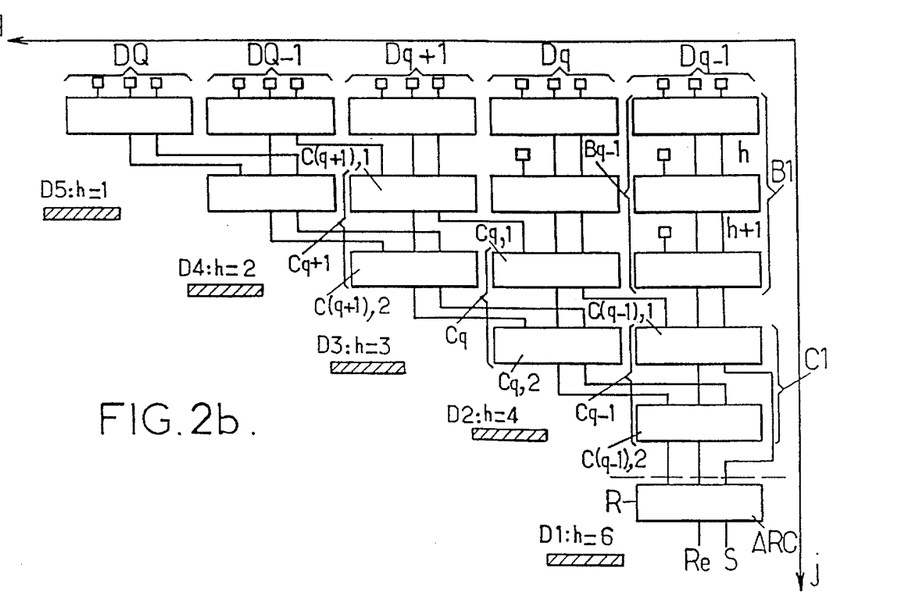
FIG. 2b shows a non-limiting and particularly advantageous embodiment of the multiplier of the invention as shown in FIGS. 2a or 2b.

A more detailed description of a particular embodiment of an overturned stairs tree structure cellular multiplier of the present invention is now given with reference to FIG. 2b in which each tree of order p–1 and of decreasing depth written A(p–1,n–(q+1)), constitutes a multiplier body CO(p,n–(q–1)) under the conditions described above, with each tree being constituted by a plurality of ARC adders in cascade.

As shown in FIG. 2b, and in order to simplify the notation, the various connector operators used are referenced with the single index that characterizes them, i.e. the rank index, it being understood that the depth index for these connector operators is representative only of the depth of the corresponding degree and is not representative of the connector operator itself.

Thus, in FIG. 2b, for a degree Dq, the simplified notation for the corresponding connector operator is "Cq". Naturally, this connector operator includes in identical manner first and second ARC adders respectively referenced 1 and 2. In FIG. 2b, the current degree, referenced Dq, is for example the degree of rank immediately greater than the rank of the degree including the root R, referenced Dq–1.

In FIG. 2b, it may be observed that the ARC adders are arranged in degrees of depth n and of rank q. Each degree Dq for q<Q–2 is formed by a branch referenced Bq constituted by a plurality of n–2 successive adders.

It can thus be seen from FIG. 2b that a five-input connector operator Cq formed as described above by means of two ARC adders, is interconnected firstly to the branch Bq to form the degree Dq of depth n, where n represents the number of adders in the degree, and secondly with the connector operators Cq+1 of higher rank, thereby forming, for the subassemblies constituted by the Q-q degrees of higher rank, a tree structure cellular multiplier body whose tree structure corresponds to that described above with reference to FIG. 2a.

Naturally, the degrees of rank Q–1 and Q are respectively constituted by a five-input connector and by an ARC adder.

The root R is itself formed by an output adder constituted by an ARC adder. The connector operator C1 is interconnected with the ARC adder forming the root R.

Thus, each branch Bq of rank q includes n–2 successive adders and has n operand inputs available, thereby making it possible to process a large number of operands as described below.

In the embodiment of FIG. 2b, to make a branch Bq of rank q, the sum and carry outputs from an ARC adder referenced h are connected to corresponding inputs of the next following ARC adder h+1, with the notation h and h+1 corresponding to the direction in which operands are processed.

A more detailed description of the interconnections between the ARC adder components of a degree Dq of rank q and the corresponding ARC adder components of the adjacent degrees Dq–1 of rank q–1 and Dq+1 of rank q+1 is given, likewise with reference to FIG. 2b.

In said figure, each connector operator Cq of order q for 1<q<Q–2 is such that the three operand inputs of the first ARC adder 1 of the connector operator Cq, i.e. the adder referenced Cq,1, are respectively connected to the sum output and the carry output of the last adder in the corresponding branch Bq and to the sum output of the first ARC adder referenced C(q+1),1 of the connector operator of higher rank q+1, which connector operator is referenced C(q+1).

In addition, the carry output and the sum output of the first ARC adder are respectively connected to an operand input of the second adder and to an operand input of the first ARC adder of the connector operator C(q−1) of lower rank q−1, said first ARC adder being referenced C(q−1),1.

Finally, the operand inputs of the second adder of connector Cq, which second ARC adder is referenced Cq,2, are respectively connected to the sum output and to the carry output of the second adder referenced C(q+1 ),2 of the connector operator C(q+1 ) of higher rank q+1.

The above-mentioned interconnection between the connectors of the degrees of ranks q−1, q, and q+1 is valid regardless of the type of tree used to form the degrees, and in particular it is valid when the above-mentioned trees are constituted by branches as shown in FIG. 2b and described above.

Figure 2C:
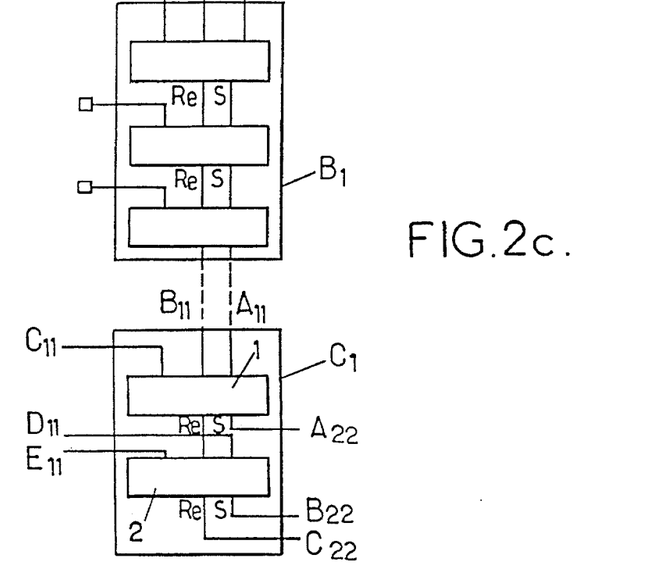
FIG. 2c shows a detail of how the component parts of the cellular multiplier shown in FIG. 2b are embodied.

FIG. 2c shows in greater detail how a connector operator and a branch are constituted, e.g. the connector operator C1 and the branch B1 of FIG. 2b. In particular, it may be observed from said figure that the five inputs of the connector operator in question are formed by inputs A11, B11, and C11 of the first ARC adder 1 and by two inputs D11 and E11 of the second ARC adder 2. The three outputs of connector operator C1 referenced A22, B22, and C22 are respectively formed by the sum output of the first ARC 1 adder and by the sum output and the carry output of the second ARC adder 2.

Figure 3A:
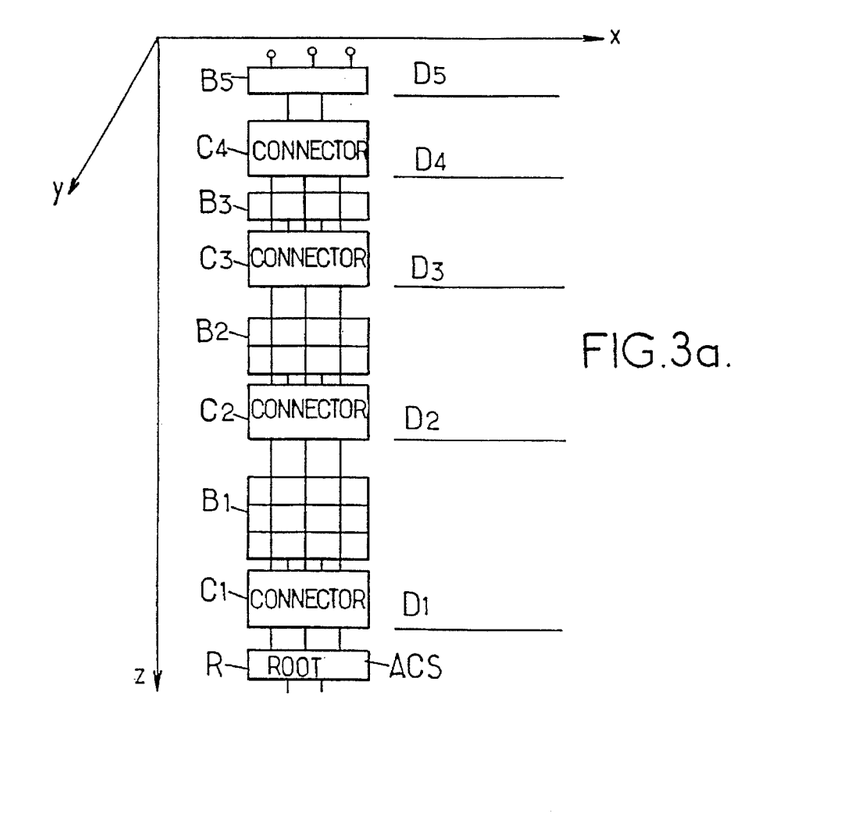
FIG. 3a shows an implementation of a topology for a cellular multiplier of the invention that is advantageous for integration on an integrated circuit chip.
Figure 3B:
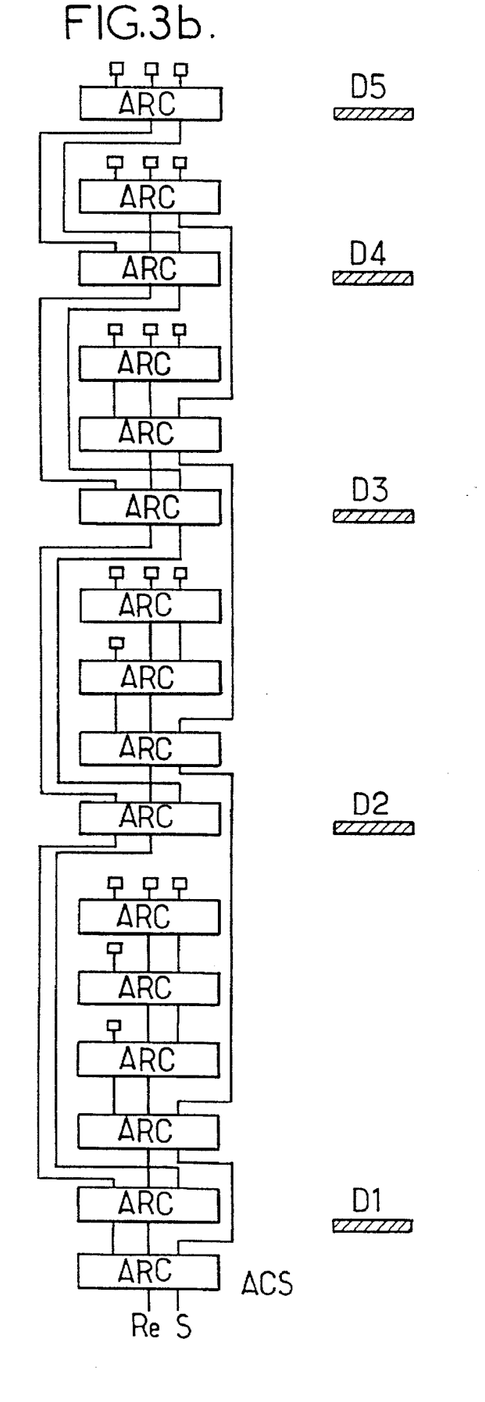
Figure 3C:
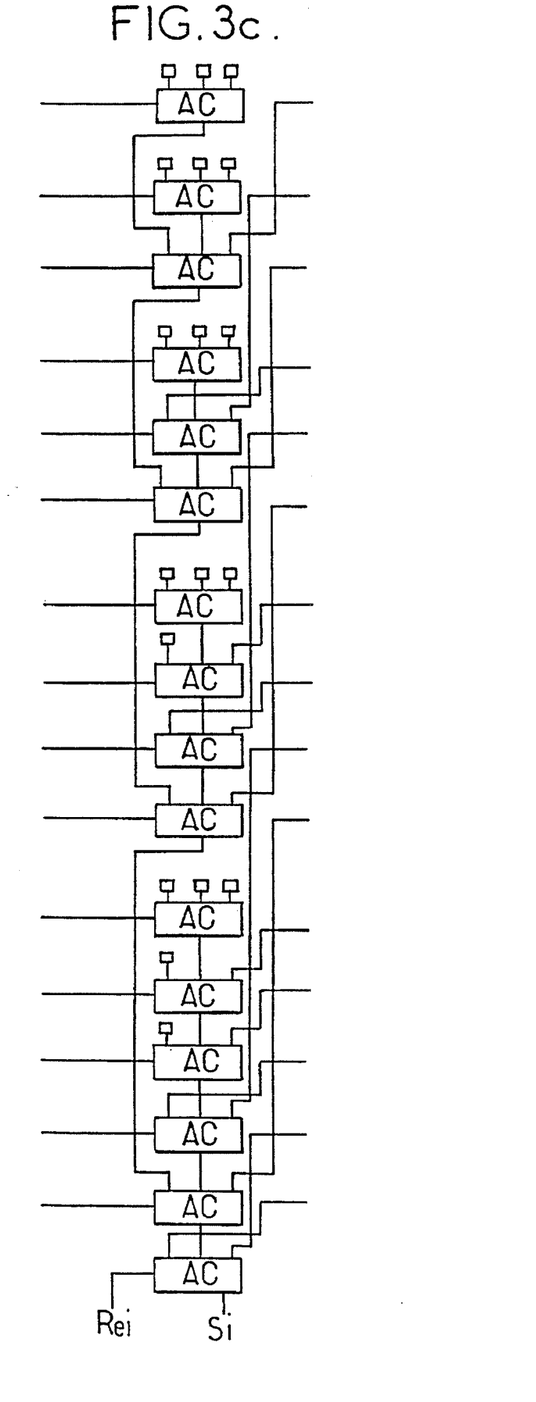

With reference to FIGS. 3a, 3b, and 3c, a more detailed description is now given of a preferred topology for implementing an overturned stairs tree structure cellular multiplier of the present invention of the kind shown in FIGS. 2a or 2b, and in the form of an integrated circuit.

In general, an ARC adder is a word level adder operator, with each word comprising s bits. Thus, an ARC adder adds three operands each constituted by a word and it delivers two outputs. Each ARC adder is made up of a plurality of full adders referenced AC and the number of full adders is determined by the number of bits in the words constituting the above-mentioned operands. A full adder is thus a bit level addition operator, i.e. it adds three same-weight bits of three different operands and outputs two different-weight bits, with these bits corresponding respectively to a sum bit S and a carry bit Re.

In accordance with a particularly advantageous aspect of the multiplier of the present invention, the ARC adders are disposed in topology which is plane and vertical, as shown in FIG. 3a, and in particular the trees and the connectors constituting the degrees D1 to D5 of ranks i to 5 are disposed in such a topology. The following degrees: D5 constituted by the branch B5; D4 constituted by connector operator C4; D3 constituted by connector operator C3 and branch B3; D2 constituted by connector operator C2 and branch B2; and D1 constituted by connector operator C1 and branch B1; and also the root R constituting the output component ACS; are all superposed in the vertical dimension of a block of silicon, i.e. in the direction referenced Z in FIG. 3a. The successive degrees D5 to D1 can thus be organized as successive layers of integration.

As also shown in FIG. 3a, one of the dimensions of the surface of the integrated circuit, e.g. the dimension X, can then correspond to the direction in which same-weight bits of the words constituting each operand are aligned, and then the Y dimension can correspond to the direction in which the different-weight bits constituting the above-mentioned words are aligned.

The embodiment of a multiplier of the present invention in the form of an integrated circuit as shown in FIG. 3a thus appears to be particularly advantageous insofar as the complexity of the corresponding structure is developed, in the end, over one dimension only of the integrated circuit chip, namely the Z dimension, with the installation of a multiplier of the present invention thus being essentially one-dimensional. In addition, it may be observed that the inter-layer connection wires or "translayer wires" (TLW) are never more than three in number between two successive layers, thereby making it possible to obtain a constant transparency factor.

FIGS. 3b and 3c are respectively views of the structure shown in FIG. 3a firstly with respect to ARC adders operating at word level, and then with respect to full adders operating at bit level. The above-mentioned structures are naturally similar to those of FIG. 3a, since, the structure shown in FIG. 3b is obtained from the structure shown in FIG. 3c by duplicating the FIG. 3c structure along the X axis, and the structure shown in FIG. 3a is then obtained by duplicating the structure shown in FIG. 3b along the Y dimension.

It will be observed in particular that the tree structure cellular multiplier of the present invention makes it possible to change the number of inter-layer connection wires of a unit compared with prior art structures as shown in FIG. 1, and although this increases the amount of surface area that is lost for integrated circuit use in the X, Y dimension, it nevertheless increase processing speed.

It will be observed in particular that overturned stairs tree structure cellular multipliers of the present invention make it possible to process S(N,2) summing type operands with a processing speed that is closer to the Wallace bottom limit than is possible with ZM tree structures, for example, which structures can only provide processing time proportional to $N^{1/2}$, as described below.

As can be observed from FIGS. 2a or 2b, the overturned stairs cellular multiplier as shown in these figures may advantageously constitute a tree structure cellular multiplier that performs S(18,2) type summing. The degrees D1 to D5 of the overturned stairs respectively include 5, 4, 3, 2, and 1 ARC adders. The tree structure cellular multiplier as shown in the above-mentioned figures has a depth of six ARC adders, which is identical to the depth of an ideal Wallace tree capable of performing S(18,2) type summing. In contrast, it may be observed that a ZM type tree for performing S(18,2) summing requires a depth of seven ARC adders, thus showing that the overturned stairs tree structure cellular multiplier of the present invention for performing S(18,2) summing is closer to the Wallace bottom limit than is the equivalent ZM tree. This is also true for larger numbers N of operands, as described below.

With respect to the general structure of tree structure cellular multipliers of the present invention, it will be observed that a multiplier body CO as shown in FIG. 2a, of depth n is made up of n'−1 degrees, a degree of depth 1 being constituted by an ARC adder such as the degree of rank Q in FIGS. 2a and 2b, and a degree of depth 2 constituted by a connector operator such as the degrees of rank Q−1 in the same figures. The multiplier body itself is then of depth n'−1 and a multiplier body of depth n' can be constructed from a body of depth n'−1 which is associated with a degree of depth n, said degree being constituted by a tree of depth n−2 plus a connector operator as described above with reference to FIG. 2a or 2b.

It is thus possible for an overturned stairs type tree of depth $\underline{n}$ to determine the number of operands N as a function of the depth of the multiplier: $N(n)=N(n-1)+n-1$, with the initial condition $N(1)=3$.

The number of ARC adders required for implementing an overturned stairs type tree structure cellular multiplier of the present invention can then be given by the equation:

$$N_{ARC}(n)=N_{ARC}(n-1)+n-1$$

with the initial condition $N_{ARC}(1)=1$.

It can thus be shown that the number N of operands capable of being processed by an overturned stairs type tree cellular multiplier of the present invention and of depth $\underline{n}$ can be deduced from the above equations as follows:

$$N=\tfrac{1}{2}n^2-\tfrac{1}{2}n+3$$

By way of example, it may be observed that an overturned stairs type tree cellular multiplier of the present invention is capable of enabling at most 24 operands to be processed for a tree structure cellular multiplier of depth 7, and an overturned stairs type tree cellular multiplier of the invention and of depth 8 is capable of processing 31 operators at most.

Figure 4A:
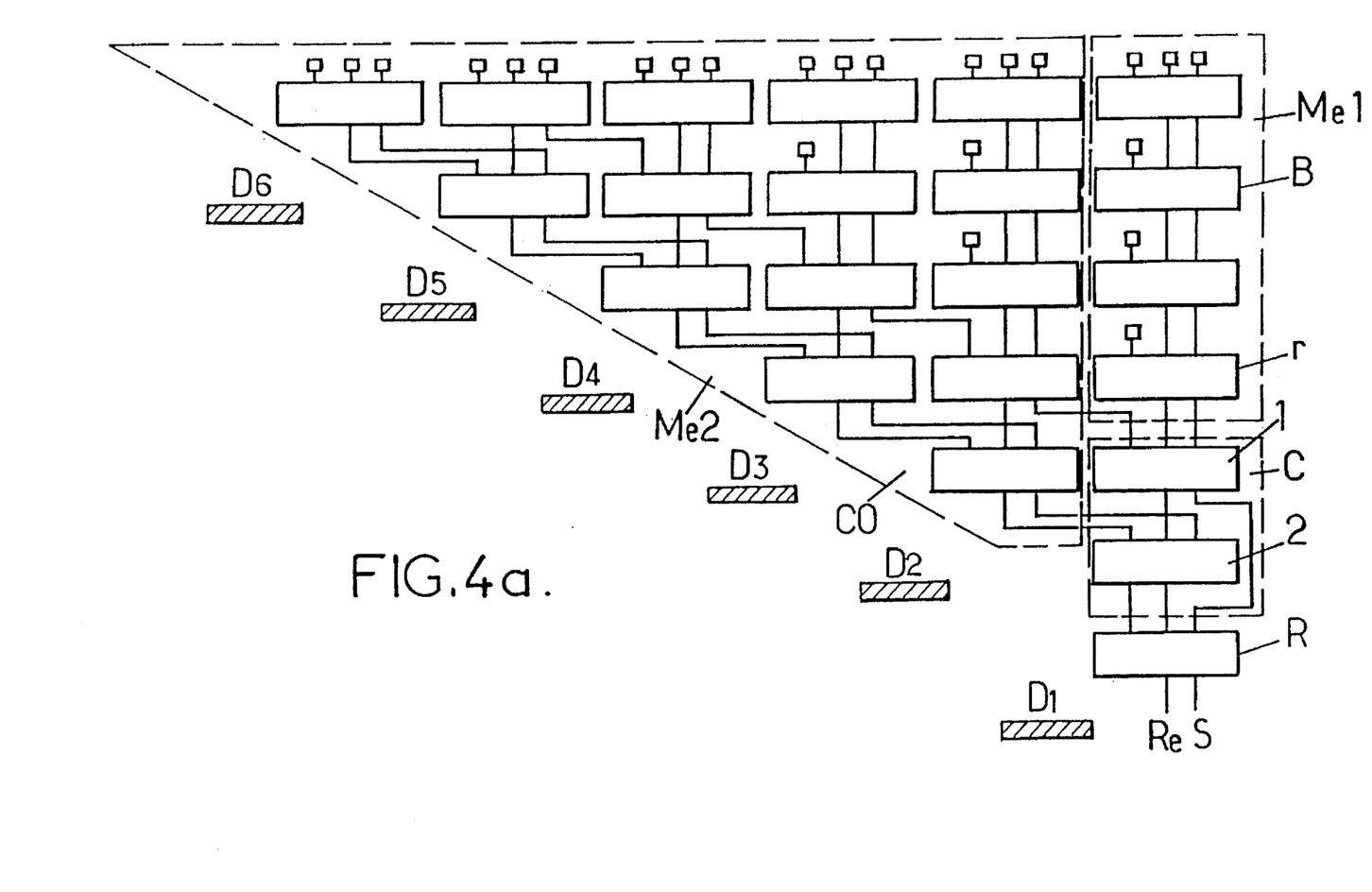
FIG. 4a shows a tree structure cellular multiplier of the present invention of depth seven, enabling S(24,2) summing to be performed on twenty-four operands.

A variant embodiment of an overturned stairs type tree cellular multiplier of the present invention of depth $\underline{n}'=7$ and of order 1 for 24 operands is shown in FIG. 4a.

It includes a first degree D1 formed firstly by a connector operator C whose three outputs are connected to the root R and secondly by a tree forming a branch B constituted by four ARC adders in cascade. The ARC adder constituting the root of the tree, i.e. the adder referenced r, is connected to the three input terminals of the first ARC adder constituting the connector operator C.

The tree structure cellular multiplier as shown in this figure also includes a multiplier body referenced CO forming an elementary multiplier Me2 of the overturned stairs type and formed by five successive degrees referenced D2 to D6. The connector operator C2 of degree D2 is interconnected with two of the inputs of the second adder ARC constituting the connector operator C.

The tree structure constituting the overturned stairs type tree cellular multiplier of the present invention and as described successively with reference to the preceding figures appears to be particularly advantageous since it enables corresponding cellular multiplier configurations to be implemented that are quite different from one another and adapted as a function of the number N of operands to be processed. In particular, as described below, it maybe observed that the tree structure cellular multiplier of the present invention can be adapted to optimize its structure as a function of the number of operands processed and in comparison with the Wallace bettom limit, as described below.

Figure 4B:
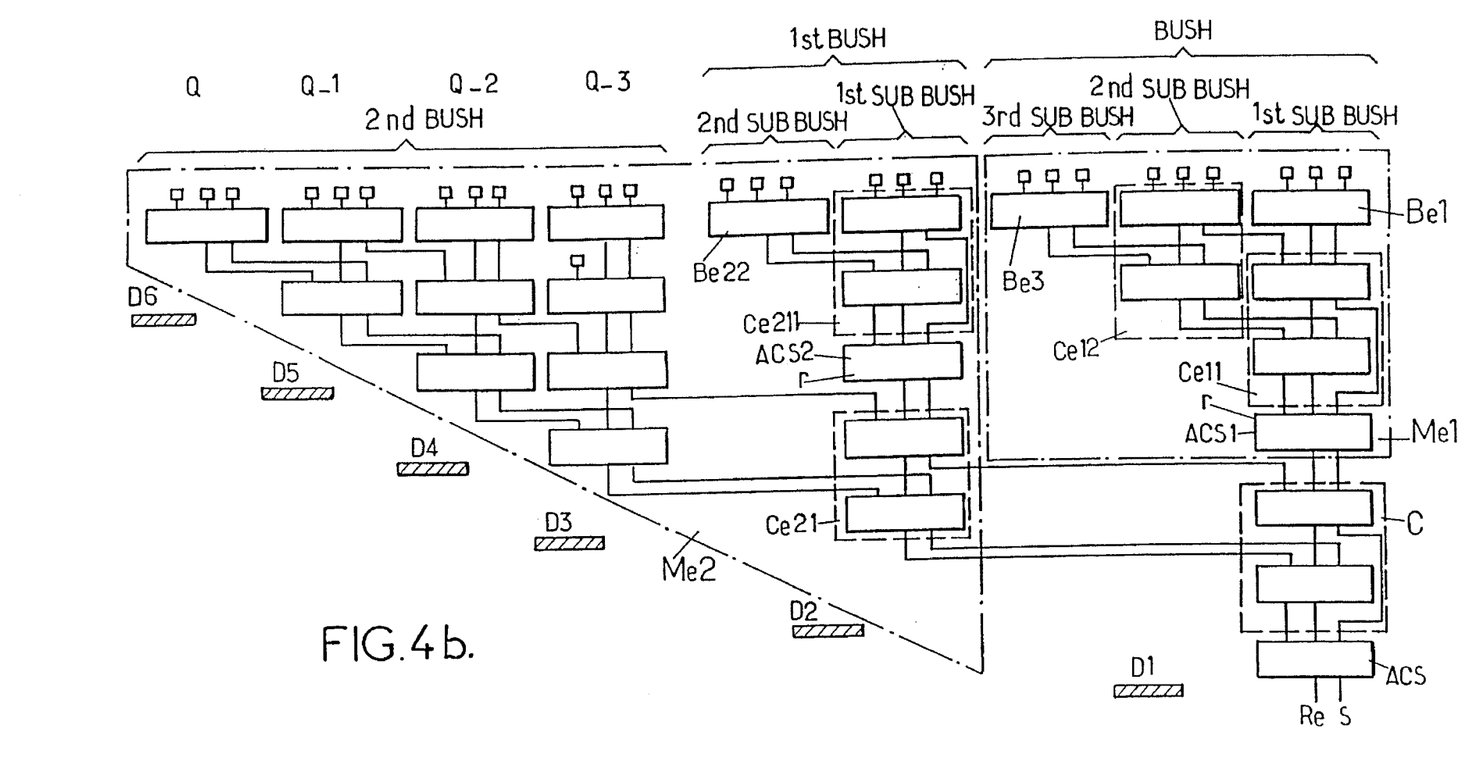
FIG. 4b shows a tree structure cellular multiplier of the present invention of order two and of depth seven, enabling S(28,2) summing to be performed on twenty-eight operands.

As shown in FIG. 4b, it is also possible to make an overturned stairs type tree cellular multiplier having the same depth $\underline{n}'=7$ as the multiplier of FIG. 4a, but suitable for a larger number of operands, with N equal to 28 in this case. As can be seen from FIG. 4b, the number of operand inputs to the degree D2 of rank 2 can be increased from 5 to 6 and the number of operand inputs to the degree D1 of rank 1 can be increased from 6 to 9.

In the embodiments of FIGS. 4a and 4b, it may be observed that the order p is greater than 1, and the processing time of the overturned stairs type trees shown in the above-mentioned figures is proportional respectively to $N^{1/2}$ and to $N^{1/3}$.

In the embodiment shown in FIG. 4b, the degrees of ranks 1 and 2 of the embodiment of FIG. 4a have been replaced by a first elementary cellular multiplier referenced Me1 of depth n−3 and of order p−1, with the degrees of rank q>3 being arranged so as to constitute a second elementary cellular multiplier Me2 of depth n−2 and order p. The first and second elementary multipliers Me1 and Me2 are interconnected at a connector C.

As also shown in FIG. 4b, the first degree D1 is then formed firstly by the connector operator C whose three outputs are connected to the root R, and secondly by a tree of the overturned stairs type. As shown in the above-mentioned figure, this tree comprises a connector operator Ce11 and an output adder referenced ACS1, which constitutes the root $\underline{r}$ of the above-mentioned tree. It will naturally be understood that the above-mentioned tree actually constitutes a bush of the overall tree, said bush comprising a first sub-bush constituted by a branch BE1 connected to connector operator Ce11, and a second sub-bush formed by a connector operator referenced Ce12 which is connected to the connector operator Ce11 constituting the bush. The above-mentioned tree constituting a bush of the overall tree further includes a third sub-bush constituted by a branch referenced Be3, which branch is formed by an ARC adder and is connected to the connector operator Ce12 of the second sub-bush.

In the same manner, the elementary multiplier Me2 constitutes a multiplier body analogous to the body CO of the embodiment shown in FIG. 4a.

As shown in FIG. 4b, elementary multiplier Me2 includes a connector operator referenced Ce21 connected firstly to a tree as defined above, constituting a first bush, and also to a multiplier body of lesser depth constituting a second bush. As shown in the above-mentioned figure, the first bush of elementary multiplier Me2 comprises first and second sub-bushes. A first sub-bush is formed by a connector operator referenced Ce211 and by an output adder ACS2 constituting the root $\underline{r}$ for the first bush. The output adder ACS2 forming the root $\underline{r}$ is connected firstly to the connector operator Ce21 of the second elementary multiplier Me2, and secondly to the connector operator Ce211 of the first sub-bush. The second sub-bush of the first bush comprises a branch referenced Be22 itself formed by a single ARC adder connected to the connector operator Ce211 of the first sub-bush.

The second bush of elementary multiplier Me2 is then formed by an overturned stairs type tree structure as shown above in FIG. 2a, 2b, or 4a, said structure being formed by for degrees of ranks Q, Q−1, Q−2, and Q−3. The tree structure of the overturned stairs type tree cellular multiplier as shown in FIG. 4b can thus be said to be a multiple overturned stairs type tree cellular multiplier of higher order $p \geq 2$ insofar as the general structure of the overturned stairs type tree is used to generate one or more auxiliary overturned stairs type tree cellular multipliers, in particular in the degrees of ranks 1 and 2, for example, thereby enabling the above-mentioned general structure to be optimized. As described below, it is shown that the general structure obtained as shown in FIG. 4b is that of a tree of depth 7, enabling 28 operands to be processed, said structure achieving the Wallace bottom limit. This result indicates that it is possible to use overturned stairs type tree cellular multipliers as shown in FIGS. 2a and 2b, for example, to locally optimize the degrees 1 and 2, i.e. the degrees corresponding to the root and the degree closest to the root, thereby optimizing the overall parameters of the general structure.

Theoretical studies have shown that for multiple tree structures, i.e. a tree structure of order $p \geq 2$ as shown in FIG.

4b, the maximum number of operands $N_p(n)$ that can be processed by a multiple tree of order p and of depth $\underline{n}$ is given by the following recurrence relationship:

$$N_p(n)=N_p(n-1)+N_{p-1}(n-3) \qquad 5$$

In the above relationship, the initial condition for an overturned stairs type tree cellular multiplier of order 0 corresponds to an iterative array of ARC adders. It is also shown that overturned stairs type tree cellular multipliers of order p require processing time that is proportional to $N^{1/(p+1)}$ where p represents the order of the multiplier.

Naturally, overturned stairs type multipliers of the present invention may be optimized from the Wallace bottom limit point of view concerning processing time by implementing multipliers of order $p \geq 2$, as described above. However, the above generalization suffers from a drawback due to the fact that the number of inter-layer connectors increases with the order of the above-mentioned overturned stairs type tree cellular multiplier. This naturally has the drawback of increasing the loss of integrated circuit area that could otherwise be used for providing integrated circuits.

Earlier studies have shown that ZM tree structures are optimum for small numbers N of operators, i.e. N={3–8, 10, 11, 14}, so long as these structures require only two inter-layer connection wires.

In accordance with a particularly surprising aspect of the overturned stairs type tree cellular multiplier of the present invention, it is advantageous when optimizing the degrees of ranks close to the initial degree including the root R to make use of ZM type tree structures in the above-mentioned degrees, with the tree constituting the bush and the first bush of elementary multipliers Me1 and Me2 in FIG. 4b then being replaced by ZM tree structures, for example.

Figure 5A:
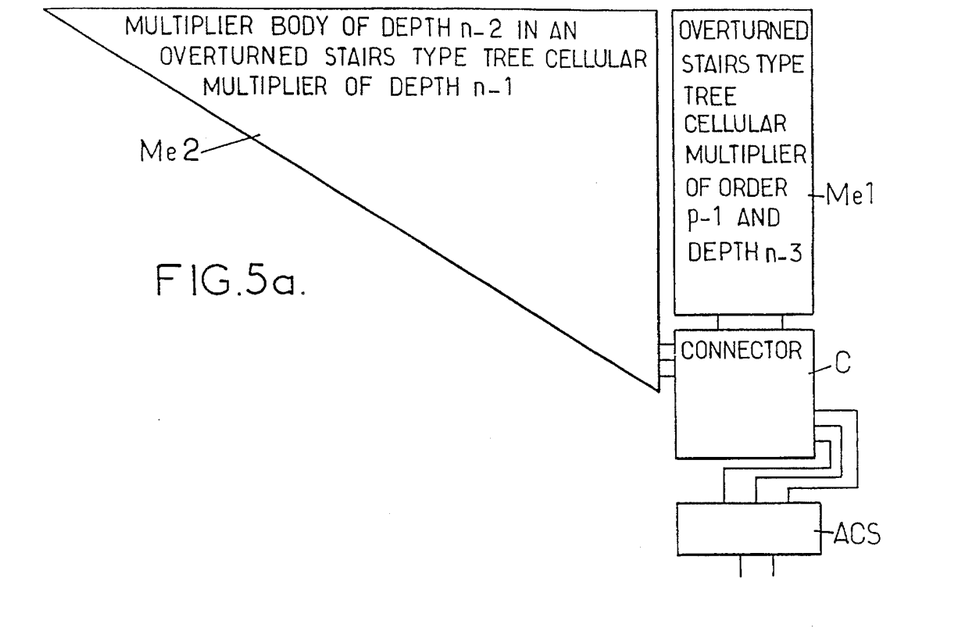
FIG. 5a is a block diagram of a tree structure cellular multiplier of order p and of depth n' in accordance with the present invention.
Figure 5B:
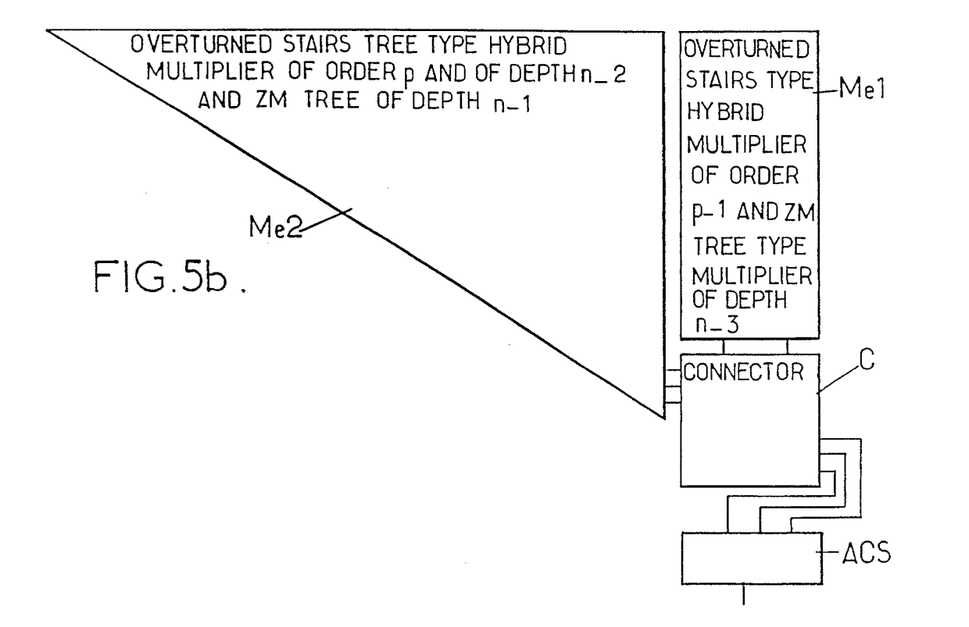
FIG. 5b is a block diagram of a hybrid type tree structure cellular multiplier of depth n' incorporating a ZM tree structure and an order p overturned stairs type tree structure within the multiplier hybrid body, and incorporating an overturned stairs type hybrid tree multiplier and a ZM tree multiplier outside the multiplier hybrid body.

Thus, as shown diagrammatically in FIGS. 5a and 5b respectively, to make a cellular multiplier of higher order $p \geq 2$, the multiplier may be made by means of a connector C connected to an output connector ACS adder constituting the root R and to an overturned stairs type tree cellular multiplier of order p–1 and depth n–3, constituting an elementary multiplier Me1. The connector C is also connected to a multiplier body of depth n–2 in an overturned stairs type tree cellular multiplier of depth n–1 which constitutes the elementary multiplier Me2.

In contrast, to constitute a Zuras-McAllister/overturned stairs hybrid type cellular multiplier of depth $\underline{n}$ and of order $p \geq 2$, as shown in FIG. 5b, the first elementary cellular multiplier Me1 of degree n–3 is constituted by an overturned stairs type hybrid multiplier of order p–1 and by a Zuras-McAllister type multiplier, while the second elementary cellular multiplier is constituted by an overturned stairs type structure of order $\underline{p}$ and of depth n–2, and by a Zuras-McAllister type multiplier.

Figure 6A:
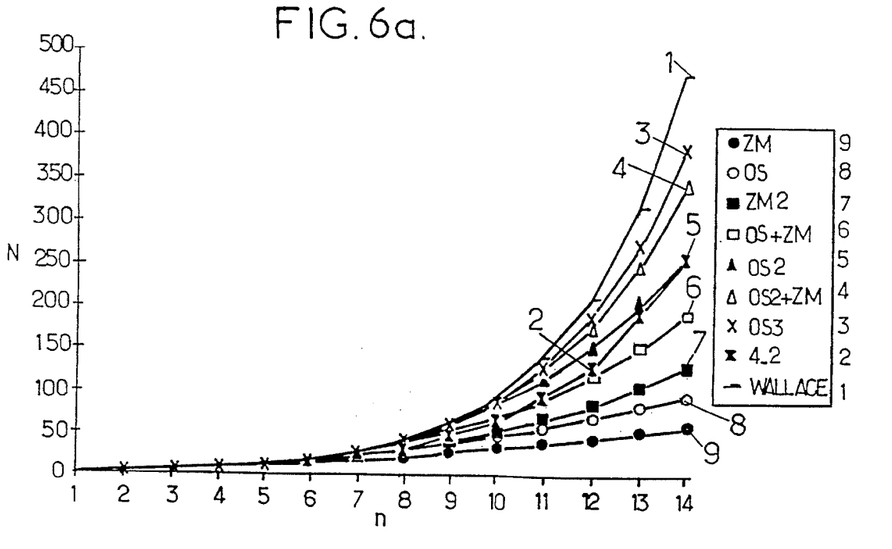
FIG. 6a is a graph comparing various possible tree structures showing the number N of operands that can be processed at a function of the depth n' of the multiplier and including the Wallace bottom limit.
Figure 6B:
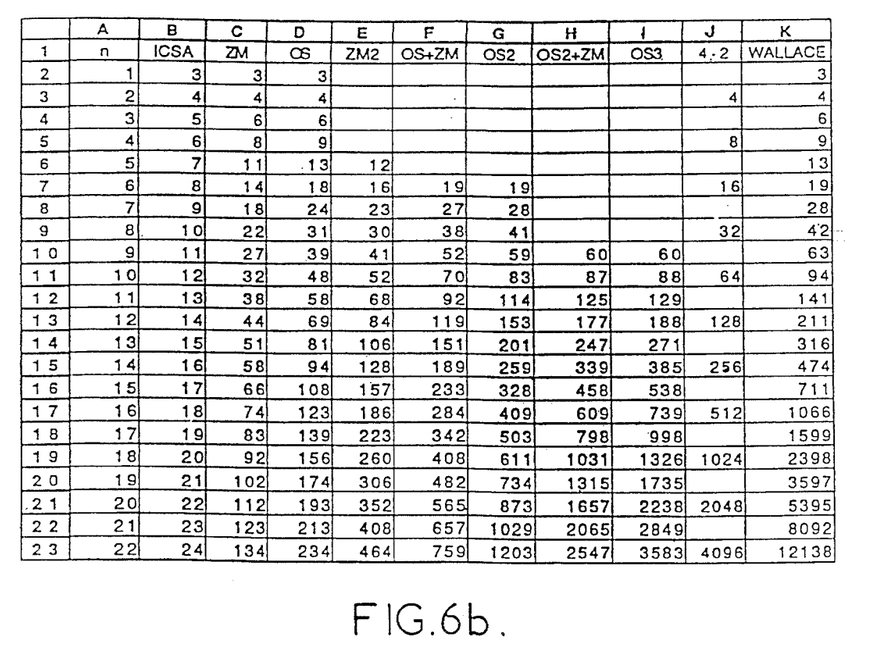

With reference to FIGS. 6a and 6b, there follows a description of a study comparing the properties of overturned stairs type tree structure cellular multipliers of order p=2 or order $\underline{p}$ greater than 2, compared with a theoretical Wallace multiplier, and compared with multiplier tree structures of the types known in the prior art, in particular such as iterative arrays of ARC adders, ZM trees, or 4-2 type multipliers.

FIG. 6a is a graph showing how the number N of operands that can be processed by the various above-mentioned types of tree varies as a function of the depth $\underline{n}$ of these multipliers in the above-mentioned tree structure. Thus, the following are shown in succession in FIG. 6a:

1) a theoretical Wallace multiplier;
2) a 4-2 type multiplier;
3) an overturned stairs type cellular multiplier of order 3 referenced OS3;
4) an hybrid overturned stairs hybrid OS2 of order 2 plus a ZM tree multiplier, OS2+ZM;
5) an overturned stairs of order 2, OS2;
6) an hybrid overturned stairs OS plus a ZM tree multiplier, OS+ZM;
7) a ZM tree of order 2, ZM2;
8) an overturned stairs type tree structure cellular multiplier OS; and
9) a ZM tree multiplier, ZM.

FIG. 6b is a table of values in which column A gives values for depth $\underline{n}$, and then columns B to K give the maximum numbers of operands that can be processed respectively by the structures 1 to 9 specified above with reference to FIG. 6a. The values contained in the column to the left of column A are values for the depth of the multiplier when the root R is taken into account.

From FIGS. 6a and 6b, it can be deduced that ZM tree structures reach the Wallace limit and thus provide the same performance as Wallace structures for the following numbers N of operands: 3 to 8, 10, 11, and N=14, in terms of the corresponding depth required for the trees. It can also be seen that ZM tree structures are nevertheless very far from the theoretical Wallace structure for higher values of N.

Similarly, with respect to the overturned stairs type tree structure cellular multiplier of the invention and as shown in FIG. 2b, for example, which multiplier is capable of performing S(18,2) summing, the depth of the corresponding tree structure is equal to 6, and this depth is equal to the depth of a theoretically ideal Wallace tree for performing S(19,2) type summing, whereas to perform S(18,2) type summing, a ZM tree would require a depth n=7. It can thus be concluded that an overturned stairs type tree structure of the present invention capable of performing S(18,2) type summing is closer to the lower Wallace limit that is the equivalent ZM tree structure. This observation is also true for other values of N.

In addition, the table of FIG. 6b shows that overturned stairs type tree structure cellular multipliers of the present invention reach the lower Wallace limit for N lying in the range 3 to 18, 20 to 24, 29, and 31.

However, the same FIG. 6b also shows that overturned stairs type tree structure multipliers of the present invention do not reach the optimum relative to the Wallace bottom limit for values of N such as N=19, 25<N<28, and N>32.

For tree structure cellular multipliers of the hybrid OS+ZM type, observation of FIG. 6b also shows that these structures reach the Wallace bottom limit for numbers of operands N such that:

N=19, 25<N<27, 29<N<28, 43<N<52, 64<N<70

It may also be observed that compared with prior art ZM tree type structures, the above-mentioned structures require only one more inter-layer connection wire than the above-mentioned ZM tree structures.

Overturned stairs type tree structure cellular multipliers of the present invention and as described above may be implemented by being integrated on a silicon substrate, for example. The integration process can then be facilitated and optimized by selecting the structure which is the most appropriate, a simple overturned stairs type tree structure, or a hybrid structure, with the choice of structure being dictated firstly as a function of structure optimization relative to the Wallace bottom limit as described above with reference to FIGS. 6a and 6b, and secondly with reference to the improvement in the number of inter-layer connection wires that are required for each structure, as described below with reference to Tables 1 and 2 accompanying the present description.

The first column of Table 1 shows the various different structures as already mentioned above in columns B to K of FIG. 6b, column 2 is labelled TLW and shows the number of inter-layer connection wires, column 3 is labelled ST and shows the processing or summing time, and column 4 is labelled N and shows the number of operands that can be processed as a function of the depth $n$ of the tree.

Table 2 of the above-mentioned appendix shows the number TLW of inter-layer connection wires required in an optimum type N,2 cellular multiplier using tree structures of constant transparency. It is recalled that for a given tree structure, "transparency" designates the minimum number of inter-layer connection wires required for each of the degrees constituting the above-mentioned structure. It may be observed that the numbers in parentheses in column TLW of Table 2 give the difference in depth between the above-mentioned structure and a theoretical Wallace tree structure.

In order to make a tree structure cellular multiplier in the form of an integrated circuit, a method of the present invention may consist in establishing a tree structure cellular multiplier in bit slices using vertical topology as shown in FIG. 3c to make up one or more degrees of a bit level cellular multiplier, then in repeating the above operation as many times as there are bits in a word representing an operand to be multiplied, thereby making one or more degrees of a cellular multiplier at word level. With reference to FIG. 3, the above-mentioned operation may be performed in one of the surface directions of the chip constituting the integrated circuit, e.g. the Y dimension.

Thereafter, the method of the present invention consists in establishing an arrangement of degrees of a cellular multiplier at word level with horizontal topology, e.g. in the X dimension of FIG. 3a, to make up an overturned stairs type tree structure cellular multiplier.

Naturally, implementation of the above-mentioned method can be optimized by choosing a real tree structure that is simple or hybrid as mentioned above. The minimum number of inter-layer connection wires can then be selected with accompanying Table 2 for numbers of operands $N \leq 129$, with the corresponding tree depths thus being minimum. It may be observed that by this selection, the tree structure cellular multipliers and their hybrid variants implemented in accordance with the method of the invention give the performance that is as good as that of the corresponding theoretical Wallace tree. Although trees implemented in this way cannot reach the Wallace bettom limit for N=42, 61 to 63, and 89 to 94, as can be seen from Table 2, the minimum distance is given for these particular cases. Overturned stairs type tree structures of the present invention then constitute the best approximations to theoretical Wallace structures that can be obtained using the solutions available.

Finally, it may be observed that tree structure cellular multipliers of the overturned stairs type and of the present invention may be used for implementing multi-operand adders.

An overturned stairs type tree structure cellular multiplier and a method of implementing it have thus been described which, in the majority of cases, enable optimum configurations to be achieved close to the corresponding theoretical "Wallace tree" structures. It may also be observed that overturned stairs type tree structures of the present invention require inter-layer interconnection configurations that are simple and regular, and which can be optimized so as to make the resulting structure equivalent to a Wallace tree structure in the most usual cases.

TABLE 1

|  | TLW | ST | N |
|---|---|---|---|
| ICSA | 0 | $O(N)$ | $n + 2$ |
| ZM | 2 | $O(2N^{1/2})$ | $n^2/4 + n/2 + [17 - (-1)^n]/8$ |
| OS | 3 | $O((2N)^{1/2})$ | $n^2/2 - n/2 + 3$ |
| ZM2 | 4 | $O(2(3N)^{1/3})$ | $n^3/24 + [43 - 3(-1)^n]n/48 + 2$ |
| OS + ZM | 5 | $O((12N)^{1/3})$ | $n^3/12 - 3n^2/8 + 29n/12 - [1 - (-1)]/16$ |
| OS2 | 6 | $O((6N)^{1/3})$ | $n^3/6 - 3n^2/2 + 22n/3 - 7$ |
| OS2 + ZM | 8 | $O(2(3N)^{1/4})$ | $n^4/48 - n^3/3 + 35n^2/12 - 29n/3 + 17 + [1 - (-1)^n]/32$ |
| OS3 | 9 | $O((24N)^{1/4})$ | $n^4/24 - 11n^3/12 + 215n^2/24 - 445n/12 + 63$ |
| 4-2 | $2(\log_2 N - 2)$ | $O(2\log_2 N)$ | $2^{n/2+1}$ |
| Wallace | ? | $O(\log_{3/2} N)$ | $2(3/2)^{n-1} < N < 2(3/2)^n$ |

TABLE 2

| N | TLW |
|---|---|
| 3–4 | 0 |
| 5–8 | 2 |
| 9 | 3 |
| 10–11 | 2 |
| 12–13 | 3 |
| 14 | 2 |
| 15–18 | 3 |
| 19 | 5 |
| 20–24 | 3 |
| 25–27 | 5 |
| 28 | 6 |
| 29–31 | 3 |
| 32–38 | 5 |
| 39–41 | 6 |
| 42 | 6(+1) |
| 43–52 | 5 |
| 53–59 | 6 |
| 60 | 8 |
| 61–63 | 5(+1) |
| 64–70 | 5 |
| 71–83 | 6 |
| 84–87 | 8 |
| 88 | 9 |
| 89–92 | 5(+1) |
| 93–94 | 6(+1) |
| 95–114 | 6 |
| 115–125 | 8 |
| 126–129 | 9 |

We claim:

1. An overturned stairs type cellular structure adder tree for processing a given integer number of N greater than 23 operands and including a plurality of interconnected carry-save adders, said carry-save adders being connected together in a plurality of Q degrees of given horizontal rank q, with $1 \leq q \leq Q$ and given depth, each of said carry-save adders having a sum output, a carry output and three inputs, said carry-save adders receiving one of said N operands as an input for each of said three inputs not receiving an input from another carry-save adder of said adder tree, wherein said cellular structure adder tree of order p and depth n', where p designates a parameter order of summing processing time of the form $N^{1/(p+1)}$ of said multiple operands and n' designates the maximum number of carry-save adders passed through by each operand for complete processing, at least comprises:

- a multiplier root R constituted by a carry-save adder, and
- a first multiplier body CO(p,n), of order p, depth n, with n=n'−1, and rank q=1, connected to said multiplier root R, said first multiplier body including:
  - a five-input connector operator C(n,q) of rank q=1 and including first and second carry-save adders connected in cascade, the carry output of said first carry-save adder being connected to one of the inputs of said second carry-save adder, said five-input connector operator C(n,q) further including three outputs constituted by the sum output of the first carry-save adder, and the sum and the carry outputs of the second carry-save adder, and being connected to said multiplier root R, and
  - a tree of order p−1, depth n−2 and rank q=1 comprising a plurality of interconnected carry-save adders including a final carry-save adder constituting a tree root r, the sum and the carry outputs of said tree root being connected to respective inputs of the first carry-save adder of said five-input connector operator of rank q=1,
- at least four successive sub-multiplier bodies of order p and of decremented depth determined by successively decrementing the depth n=n'−1 by one and incremented rank determined by successively incrementing the rank q by one, with 2≦q≦Q−1, each of said sub-multiplier bodies comprising:
  - a single five-input connector operator of corresponding incremented rank and corresponding decremented depth and including first and second carry-save adders connected in cascade and connected to the five-input connector operator of the sub-multiplier body of immediately preceding rank,
  - a tree of order p−1 and successively decremented in depth by 1 with respect to said tree of the sub-multiplier body of immediately preceding rank, said tree being connected to said single five-input connector operator of corresponding rank;
  - the successive sub-multiplier body of rank q=Q−1 thus consisting of a single five-input connector operator of corresponding rank,
  - the five-input connector operator of said sub-multiplier bodies of rank 2 being connected to the five-input connector operator of the first multiplier body,
- said adder tree further including, forming said degree of rank Q, a carry-save adder of rank q=Q and depth n=1 having carry and sum outputs connected to the first carry-save adder of the five-input connector operator of the submultiplier of the immediately preceding rank Q-1.

2. A multiplier according to claim 1, wherein said adders are disposed in a plane and vertical topology.

3. A multiplier according to claim 1, having a depth n'=7, an order p=1, and N=24 operands.

4. The adder tree of claim 1, in which said first multiplier body and successive sub-multiplier bodies of rank q and depth n constitute successive degrees of corresponding rank q with 1≦q≦Q−2, each of said degrees consisting at least of one five-input connector operator of same rank q and a tree of same rank q and given depth, thereby forming an overturned stairs structure cellular adder tree.

5. A multiplier according to claim 4, said carry-save adders being stacked-connected in degrees of decremented depth n with incremented horizontal rank q, each degree of rank q, for q>Q−2, comprising:

- a branch of same rank q having a plurality of n−2 successive carry-save adders; and
- a five-input connector operator of same rank q including first and second adders connected in cascade, inputs of said connector operator of same rank q being connected firstly to said branch to form said degree of rank q, where n represents the number of carry-save adders in said degree and secondly to the connector operator of higher rank q+1 to form a cellular multiplier body having a tree structure with corresponding arborescence for the subassembly constituted by the Q−q degrees of higher rank;

said multiplier further including

- a degree of rank Q−1 having a five-input connector operator interconnected to degree of rank Q−2,
- a degree of rank Q having an adder interconnected to said degree of rank Q−1, and
- an output carry-save adder interconnected with said connector operator of rank 1.

6. A multiplier according to claim 5, wherein each branch Bq of rank q including n−2 successive adders has n̄ operand inputs.

7. A multiplier according to claim 6, wherein the sum and carry outputs from an adder in each branch are connected to the corresponding inputs of the immediately subsequent adder in the same branch.

8. A multiplier according to claim 6, wherein for each connector operator of rank q where 1<q<Q−2:

- the three inputs of the first adder are respectively connected to the sum output and to the carry output of the last adder in the corresponding branch of rank q, and to the sum output of the first adder of the connector operator of higher rank q+1;
- the carry output and the sum output of the first adder of rank q are respectively connected to an input of the second adder and to an input of the first adder of the connector operator of lower rank q−1; and
- two inputs of the second adder of rank q are respectively connected to the sum output and to the carry output of the second adder of the connector operator of higher rank q+1.

* * * * *